April 7, 1970  A. A. NEUWALD  3,505,432

POLYOLEFINE SCENTING METHOD

Filed Jan. 28, 1966

INVENTOR.
ALFRED A. NEUWALD
BY
McGlew & Toren
ATTORNEYS.

3,505,432
POLYOLEFINE SCENTING METHOD
Alfred A. Neuwald, 905 West End Ave.,
New York, N.Y. 10025
Filed Jan. 28, 1966, Ser. No. 523,697
Int. Cl. C08f 29/02
U.S. Cl. 260—93.7                          1 Claim

ABSTRACT OF THE DISCLOSURE

Method of scenting polyolefin. A first amount of liquefied polyolefin is mixed with a scent imparting material. Drops are formed from the mixture and the drops are solidified. The solidified drops are then melted with a second amount of unscented polyolefin, the second amount being larger than the first amount. The mixture thus obtained is again solidified.

---

Figure 1:
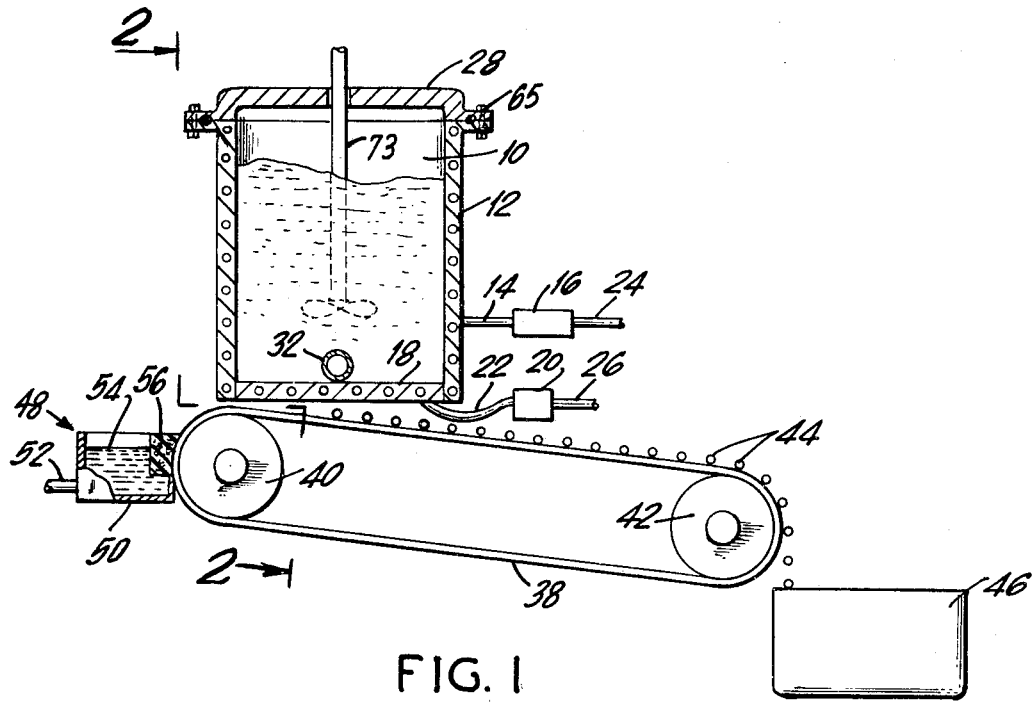

This invention generally relates to scenting procedures and is particularly directed to a novel method and apparatus for producing scented polyethylene and polypropylene (hereinafter being referred to as polyolefines).

As is well known in the art, it is extremely difficult to admix polyolefines with extraneous materials such as dyes or scent or aroma imparting materials so as to obtain a product through which the extraneous material is uniformly and homogeneously distributed. Commercial polyethylenes and polypropylenes are solid materials at ordinary temperatures. For manufacturing purposes, however, these polyolefines are heated to liquid or highly viscous state in order to shape them into the desired form by molding, casting, extrusion, etc. If an extraneous material in liquid form is added to raw polyolefin particles, for example a dye or a scent imparting material such as a perfume essence, the liquid extraneous material has a tendency to separate and to form a separate phase which accumulates at the bottom of the mixing vessel. It is, therefore, extremely difficult to scent polyolefines to any appreciable extent and, prior to this invention, it has not been possible to obtain polyolefines containing a relatively large amount of scenting material in pellet form.

Accordingly, it is a primary object of this invention to provide a procedure according to which a relatively large amount of scent imparting material can be incorporated in polyolefines without losing quality and strength of the scent.

In accordance with this invention, the scenting is effected in two stages. In a first stage, polyolefin in molten form is admixed with a high percentage of scent imparting material and the mixture is solidified in the form of pellets or beads. These pellets thus contain a high percentage of scent and are in fact master pellets which thereafter, in a second stage, are admixed and liquefied with unscented polyolefin to scent a large amount of polyolefin.

In accordance with the present invention, aroma containing or scented materials are added to polyolefines in a large closed container or drum which is maintained under a controlled temperature condition while the polyolefin in a melted condition is mixed with the scented or aromatic substance under agitation. In order that the aromatic substance be added uniformly to the polyolefin, the temperature of the melt is constantly controlled during the process. The mixture of the polyolefin with the aromatic substance is then directed through an elongated conduit or pipe element having a plurality of orifices adjacent the lowermost portion thereof. The polyolefin enriched by the scented substance is permitted to drip through the orifices onto a continuously moving cooled conveyor upon which the polyolefin solidifies into small size pellets with the aromatic substance imprisoned therein. The improved apparatus advantageously includes a conveyor of a material which will not adhere to the polyolefin. In order that the droplets form into uniform pellets or beads, the conveyor is continuously washed with a liquid such as water to maintain the surface relatively cool. The pellets are delivered by the conveyor into a container and packaged for shipment.

The invention provides an improved process for forming scented polyolefin elements such as pellets which comprises heating the polyolefin with a material having a selected scent or aroma at a temperature in which the polyolefin remains liquid, such as a temperature range of 250° to 300° F. If polyethylene is used as polyolefin, it is preferably one that has a melting point in the range of 200° to 280° F. and is preferably odorless and colorless. The viscosity of the polyethylene is preferably in the range of 180 to 220 sayboldt seconds. The operating temperature is maintained in the container preferably by electrical thermostatic elements which permit a controlled temperature in the range of 250° to 300° F. The lowermost portion of the container is maintained at a slightly lower temperature and the material of the container is taken off at such location for delivery through the conduit and discharge by dripping through the orifices in such conduit.

Accordingly, it is a further object of this invention to provide a process for adding a scent or aroma to polyolefin which comprises heating the polyolefin until it is melted and adding the aromatic material thereto and stirring to form a homogeneous mixture, and while the mixture is maintained at a uniform temperature above the melting point of polyolefin permitting the polyolefin and aromatic material mixture to feed from the lowermost portion of the container into a perforated tube and to drip through the perforations of the tube onto a surface which is nonadherent to the polyolefin in order to form individual pellets.

A further object of the invention is to provide an apparatus for forming polyolefin pellets which have a scented material added thereto which includes a container for heating a mixture of the polyolefin with the scented material arranged above a moving conveyor onto which the mixture is permitted to drop for the formation of hardened pellets on the conveyor.

A further object of the invention is to provide a device for the formation of polyolefin pellets with a scented material dispersed throughout each pellet which comprises a closed container having heating and mixing means for heating and mixing the scented material and the polyolefin while in a melted state and a moving conveyor arranged to move below the container, the container having an outlet pipe extending outwardly from the lowermost portion thereof disposed over the conveyor and having openings permitting the dripping of the scented polyolefin mixture onto the conveyor, and means for wetting the surface of the conveyor for maintaining it in a cool state whereby the polyolefin which is dropped onto the container will form into hardened pellets having a scent.

A further object of the invention is to provide a device for forming polyolefin into small scented pellets which is simple in design, rugged in construction and economical to manufacture.

By mixing molten polyolefin with an aromatic or scent imparting substance in liquid form in a closed container, to wit, a container which is hermetically sealed to prevent escape of volatile matter, an intimate mixture of the polyolefin with the scent imparting material is obtained and the polyolefin has a tendency to entrap or imprison the scenting material. The success of the operation is contingent on the subsequent formation of pellets or beads. The scenting material in accordance with the teachings of this invention is bodily imprisoned within the molecular polyolefin structure of the pellets. The concentrated scented pellets formed are subsequently mixed with or remelted in a larger body of the respective unscented polyolefin to dilute the concentrated pellets and to obtain a polyolefin having a lesser concentration of scenting material.

A large variety of aromatic or scenting materials may be used for the purposes of this invention.

Generally, the scent imparting material should be oil-soluble since oil-soluble scented substances also dissolve in polyolefines. Any oil-soluble perfume essence, flavor or aromatic chemicals may thus be incorporated into the polyolefin.

In order to prevent losses during the manufacture, low boiling, extremely volatile scenting materials are avoided as much as possible. Rather, scenting materials such as perfume essences and concentrates derived from resinous, heat resisting components are preferred. Since the admixture of the scenting material with the polyolefin is carried out in an airtight vessel, losses are reduced to a minimum and the vapor space above the melt is soon saturated. Due to the mixing, any scent which may have escaped into the vapor space is re-introduced into the molten mass and partially imprisoned therein. Generally, a mixing of about 5 to 10 minutes is sufficient for a batch of 150 to 300 pounds during which period only minimal losses will occur, the losses, of course, being dependent on the boiling point of the aromatic substance. Generally, it has been established that at operating temperatures of 220° to 250° F. insignificant losses occur, and that this temperature range does not affect the quality of the scent or aroma.

When the scented liquid polyolefin exits through the respective orifice of the outlet pipe, solidification of the droplets on the moving cooled conveyor is substantially instantaneous so that no significant losses of scenting material take place.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
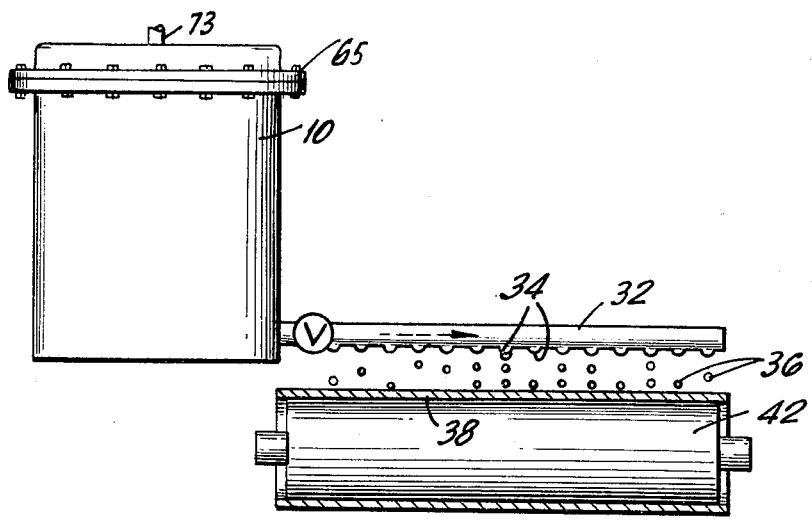

In the drawings:

FIG. 1 is a partial side elevation and partial sectional view of an apparatus for forming scented polyethylene pellets constructed in accordance with the invention; and FIG. 2 is a section taken on the line 2—2 of FIG. 1.

Referring to the drawings in particular, the invention embodied therein comprises a device for forming scented polyolefin pellets which comprises a vat or container 10 into which a mixture of polyolefin, such as polyethylene, and an aromatic substance or scented material is placed. The container is closed by an airtight lid 28, clamped to the container by clamps 65. A stirrer 73 traverses the lid or cover 28 in airtight manner and is rotated in suitable manner. A surrounding cylinder 12 having heating coils which are supplied with electrical current through cable 14 from a rheostat or control 16 is operated to maintain the temperature inside the container 10 such that polyethylene in the container will be maintained in a molten or liquid state. It has been found advantageous to employ a colorless, odorless polyethylene with a viscosity ranging between 180 and 220 S.U.S. and having a melting point in the neighborhood of 220° F. The heater 12 is operated to maintain the upper portion of the container 10 within a temperature range of from 250° to 350° F. An additional bottom heater 18 is regulated through a control 20 connected thereto through a connecting wire 22 to maintain the lower portion of the container 10 within a temperature range of from 250° to 350° F.

In accordance with the invention, polyolefin added to the container 10 is heated from 10 to 12 hours whereafter a scent or aroma imparting material is quickly added to the melt. The material must be compatible with the polyolefin and forms a homogeneous liquid melt therewith. The scented material is of a type selected for the particular aroma desired and formulated specifically for the scenting purpose for which the polyolefin will be employed. The heat resisting oils and aromatic materials, in some instance in solid or powered form may be employed and added to the polyolefin in the container 10. Generally, about 10–30% by weight of scenting material are added to the polyolefin.

After the scent imparting material is added to the container 10, the mixture is stirred for a few minutes, for example 5 to 15 minutes, and maintained within the temperature ranges indicated previously by the heating coils 12 and 18, respectively. The controls 16 and 20 are connected through cables 24 and 26 to a suitable supply of electrical current for supplying the power for heating purposes.

Thereafter, the valve is opened permitting the mass to flow outwardly through a conduit 32 having a multiplicity of orifices 34 adjacent the lower side thereof. The outer end of the conduit 32 is closed so that the liquid polyolefin and aroma mixture will continuously drop through the orifice 34 downwardly from the conduit 32. During this time the temperature of the polyolefin and aroma mixture in the container 10 is accurately controlled so that a temperature of in the range from 210° to 275° F. will exit in the conduit 32. The regulation of the temperature through the control 16 and the control 20 is essential in order to insure temperature balance to provide for the continuous dropping or dripping of molten polyolefin and scenting mixture through the orifices 34 at a range which will insure the formation of droplets 36 which will fall downwardly onto a moving conveyor belt 38 trained to run between conveyor wheels 40 and 42 beneath the conduit 32. When the droplets 36 fall onto the conveyor belt 38, they form pellets 44 which harden almost instantaneously and fall off the end of the conveyor 38 into a container 46 which is advantageously filled with water or some other suitable liquid to insure the rapid cooling of each of the pellets. The pellets 44 are then collected from the container 46 and packaged for shipment.

A feature of the invention is the provision for moistening the conveyor belt 38 to insure the rapid formation of the solid polyolefin scented pellets 44 without sticking to the belt. The belt 38 is advantageously of a material which will not normally stick to a melted plastic, but the moistening means 48 insures a sufficiently cold temperature of the belt surface for the adequate formation of the pellets 44. The moistening means comprises a container 50 which is continuously fed with water 52 to maintain a level 54 for moistening a sponge element 56 which bears against the exterior surface of the belt 38.

EXAMPLE I

Formulation for obtaining vanilla scent

Vanilla:
    Vanillin—10 grams
    Ethyl vanillin—3 grams
    Benzo dihydro tyrone—3 grams
    Hellotropin—1 gram
    Vanitrope (propenyl wuaicol)—½ gram
    Balsam Peru—1 gram
    Aldehyde C18: Gamma nonyl lactone—¼%
    Benzaldehyde: NF VII—¼%

EXAMPLE II

Formulation for obtaining Chypre "I" scent

| Chypre "I": | Parts by weight |
|---|---|
| American cedar oil | 200 |
| Patchouli oil | 50 |
| Vetiver oil | 30 |
| Bergamot oil | 150 |
| African geranium oil | 50 |
| Coumarin | 60 |
| Resinodour oak moss | 80 |
| Resinodour tolu | 200 |
| Resinodour labdanum | 150 |
| Musk xylene | 10 |
| Musk ambrette | 15 |

EXAMPLE III

Scented polyethylene pellets having a pronounced vanilla scent were prepared as follows:

75 pounds of polyethylene of a melting point of about 220° F. were heated to about 230° F. in a container of the kind illustrated in FIGS. 1 and 2. 25 pounds of the vanilla formulation of Example I were then quickly added to the liquified polyethylene, the lid 28 was put in place and the agitating means 73 were actuated. The temperature was maintained at about 225° F. and the mixing was continued for about 5–15 minutes. The valve 30 was then opened to allow flow of the molten polyethylene enriched with the vanilla-containing material to exit through the orifices 34. The liquid falling through the orifices 34 solidified almost instantaneously upon impact with the moving cooled conveyor 38. Solid polyethylene beads or pellets 44 having a pronounced vanilla scent were thus formed. Analysis demonstated that the pellets contained about 25% of the vanilla formulation so that almost no losses of the scenting substance did occur. These pellets may be called master pellets.

50 pounds of the vanilla-containing master pellets were then added to 1000 pounds of unscented polyethylene powder and the mass was heated to liquid state. The liquid was molded into thin sheets or films. The sheets or films had a pronounced vanilla aroma.

EXAMPLE IV 100 pounds of polypropylene were heated to about 300° F. 30 pounds of the essence as described in Example II were added to the liquified polypropylene. The procedure was carried out in the apparatus shown in FIGS. 1 and 2. After mixing for about 8 minutes, the valve 30 was opened to allow the exit of the polypropylene-scented material mixture whereby solid pellets having a pronounced perfume smell were formed on the conveyor. The pellets thus obtained were then admixed with about 20 times their weight of unscented polypropylene and the mixture was heated and molded into flat discs. The flat discs had a strong and pleasant perfumed smell or scent.

While a specific embodiment of the invention has been shown and described in detail to illustrate the application of the inventive principles, it will be understood that the invention may be embodied otherwise without departing from such principles.

What is claimed is:

1. A method of scenting a polyolefin, which comprises:
   (a) mixing a first amount of liquefied polyolefin with a relatively large amount of scent-imparting material to form a flowable mass;
   (b) forming drops from said mass and causing substantially instantaneous solidification of said drops into polyolefin pellets having a relatively large amount of scent-imparting material imprisoned therein:
   (c) melting said pellets with a second amount of said polyolefin, said second amount being larger than said first amount; and
   (d) solidfying the melt of (c).

References Cited

UNITED STATES PATENTS

| 3,150,212 | 9/1964 | Jacklin | 264—13 |
| 3,242,237 | 3/1966 | Belak et al. | 264—13 |
| 3,341,087 | 9/1967 | Rosin et al. | 264—13 |

JOSEPH L. SCHOFER, Primary Examiner

S. M. LEVIN, Assistant Examiner

U.S. Cl. X.R.

260—94.9; 264—13, 4